(12) United States Patent  (10) Patent No.: US 8,573,375 B2
Krafft et al.  (45) Date of Patent: Nov. 5, 2013

(54) ELECTROMAGNETIC FRICTION CLUTCH

(75) Inventors: Rainer Krafft, Heiligenberg (DE); Jürgen D'Angel, Ravensburg (DE)

(73) Assignee: Licos Trucktec GmbH, Markdorf (DE)

( * ) Notice: Subject to any disclaimer, the term of this patent is extended or adjusted under 35 U.S.C. 154(b) by 236 days.

(21) Appl. No.: 12/835,120

(22) Filed: Jul. 13, 2010

(65) Prior Publication Data

US 2011/0005887 A1  Jan. 13, 2011

(30) Foreign Application Priority Data

Jul. 13, 2009 (DE) .......................... 10 2009 033 179

(51) Int. Cl.
F16D 19/00 (2006.01)
F16D 27/00 (2006.01)
F16D 37/00 (2006.01)

(52) U.S. Cl.
USPC ....................................... 192/84.31; 192/48.2

(58) Field of Classification Search
USPC ............................................ 192/84.31, 48.2
See application file for complete search history.

(56) References Cited

U.S. PATENT DOCUMENTS

| 8,011,486 B2* | 9/2011 | Juergensmeyer et al. ... 192/48.2 |
| 2003/0192763 A1 | 10/2003 | Inoue et al. |
| 2004/0256192 A1 | 12/2004 | Hill et al. |
| 2006/0124424 A1* | 6/2006 | Inoue et al. ................. 192/48.2 |
| 2007/0023251 A1 | 2/2007 | Juergensmeyer et al. |

FOREIGN PATENT DOCUMENTS

| DE | 10 2004 015 655 A1 | 10/2004 |
| EP | 1 353 051 A2 | 10/2003 |
| EP | 1 577 142 A2 | 9/2005 |
| EP | 1 748 207 A2 | 1/2007 |

* cited by examiner

*Primary Examiner* — David D Le
*Assistant Examiner* — Colby M Hansen
(74) *Attorney, Agent, or Firm* — Burr & Brown

(57) ABSTRACT

The invention discloses an electromagnetic friction clutch for driving a fan impeller in the engine compartment of a vehicle. The clutch includes a disk rotor consisting of a plane flat part, a further clutch element which is supported so that it is freely rotatable and which can be driven by the rotor through controllable friction contact, and elements for transmitting a rotational movement according to a principle of an eddy current drive with an eddy current ring fitted to the outer edge area of the disk rotor of the clutch.

9 Claims, 1 Drawing Sheet

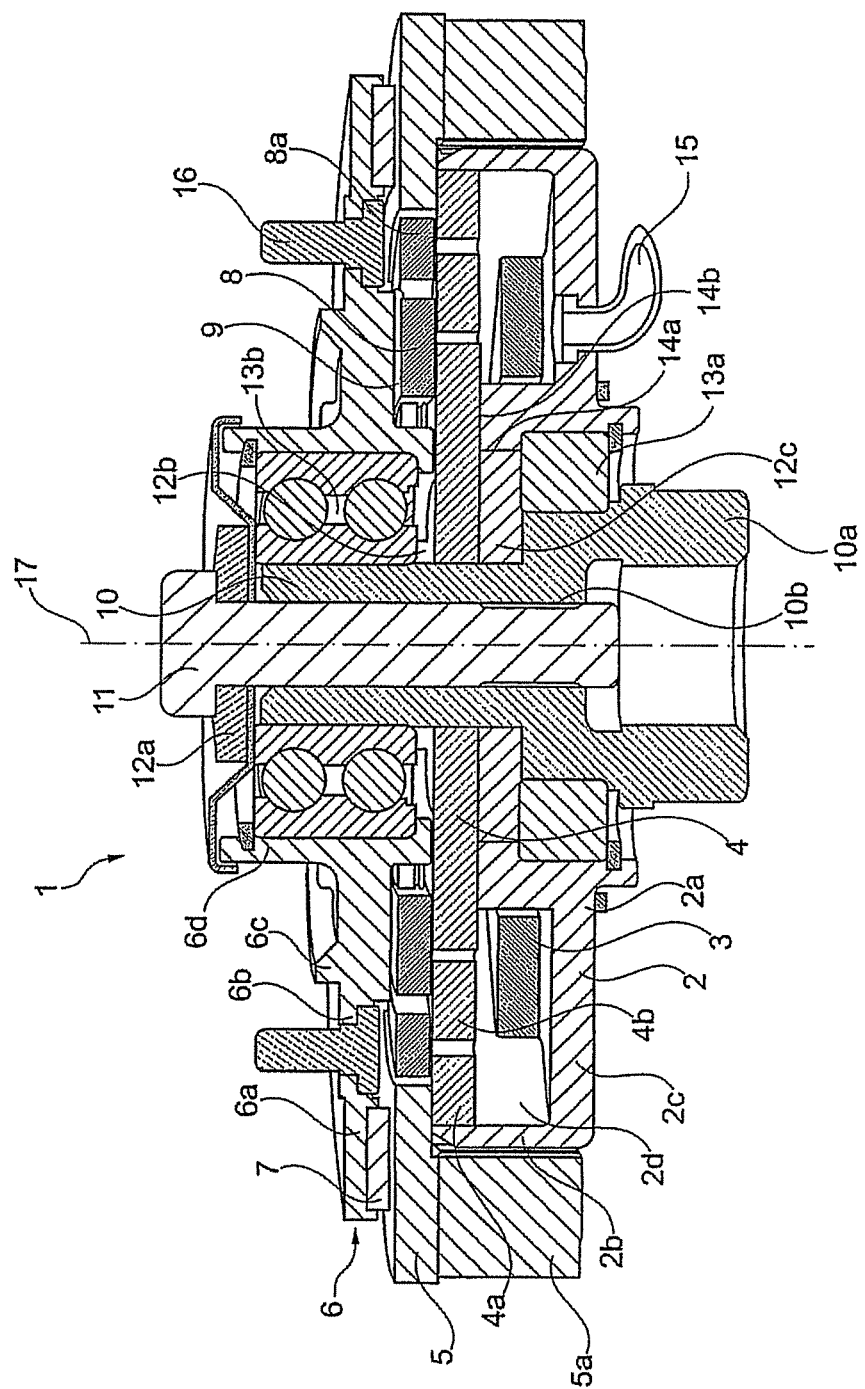

ELECTROMAGNETIC FRICTION CLUTCH

This application claims the benefit under 35 USC §119(a)-(d) of German Application No. 10 2009 033 179.4 filed Jul. 13, 2009, the entirety of which is incorporated herein by reference.

FIELD OF THE INVENTION

The invention relates to an electromagnetic friction clutch.

BACKGROUND OF THE INVENTION

Electromagnetic friction clutches of many different types are known, particularly in the field of vehicle construction. They are often used to control the distribution of a proportion of the mechanical power output of a main drive unit to one or more auxiliary units. Some designs are also known which combine an electromagnetic friction clutch with an eddy current drive. This makes it possible to avoid shutting down an auxiliary unit or to transmit a lower rotational speed than that of the drive for energy-saving operation. In order to support the transmission of rotational movements according to an additional operating principle, further components must be accommodated and catered for in the design of an electromagnetic friction clutch. At the same time further simplification and reduction in the size of known designs face the problem that the heat generated by eddy currents in the clutch has to be dissipated to the surroundings.

SUMMARY OF THE INVENTION

The object of the invention is to provide a comparatively simple and compact clutch. In particular, the friction clutch according to the invention is intended to allow cost-effective manufacture for applications in vehicle construction, for example, as a fan clutch, even in small quantities.

The invention proceeds from an electromagnetic friction clutch, which comprises a disk rotor consisting of a plane flat part having two planar main sides, a further clutch element which is supported so that it is freely rotatable and which can be driven by the rotor through controllable friction contact, and elements for transmitting a rotational movement according to the principle of an eddy current drive. The essence of the invention resides in the fact that an eddy current element is attached to an outer edge area of the disk rotor.

The clutch according to the invention may be embodied in such a way that the armature disk is rotationally fixed to the freely rotatable clutch element, for example, and can be mechanically engaged by electrical current flow in the electromagnetic coil. An embodiment of the invention in which the armature disk is rotationally fixed to the disk rotor, for example, is equally possible, the disengaged state being brought about by an energizing of the magnetic coil. The disk rotor can be manufactured as a circular disk, for example, blanked from sheet steel or produced in plane disk form through a laser cutting process. Apart from the eddy current element fitted thereto, the disk rotor consists exclusively of the disk-shaped, plane flat part. The disk rotor is preferably composed of soft-magnetic material. To enhance the force of attraction to an armature disk, a plurality of annular segments can be magnetically divided from one another on the disk rotor concentrically with the rotor axis of rotation.

According to the invention an area, on which an eddy current element, particularly one composed of a highly electrically conductive metal, is fitted to the disk rotor, is provided at the outer edge of the disk rotor. A suitable fixing of the eddy current element to the disk rotor can advantageously be selected according to the material combination of the disk rotor and eddy current element. For example, the two components can be non-positively connected together, for example by bolting or riveting on, or by adhesive bonding, or they can be connected together through positive interlock, for example, by casting on or extrusion.

The eddy current element may be of any design dimensions extending radially from the edge area of the disk rotor. In this way the eddy current element can advantageously be adapted to a rotational speed that is to be transmitted. In order to dissipate the heat generated by eddy currents to the surroundings, the eddy current element may project beyond the annular zone in which eddy currents are generated. In an axial direction the eddy current element may extend into the area of a housing of an electromagnet. The eddy current element may substantially overlap the housing.

In a preferred embodiment of the invention, the eddy current element is fitted to an outer edge area of a planar main side of the disk rotor. It is especially preferable to fit the eddy current element to that main side of the disk rotor which is situated further away from the electromagnet, in order to avoid a detrimental conduction of the magnetic flux. Connecting the components via sides, the surfaces of which are perpendicular to the clutch axis of rotation, affords the advantage that the size of the connecting surface can be adapted relatively easily to the forces acting on the connection. A further advantage is that the outer circumferential surface of the disk rotor remains, at least in part, fully accessible, so that this external face can be used to conduct the magnetic flux.

In a further preferred embodiment of the invention, magnets are fitted to the freely rotatable clutch element, in such a way that under a rotational movement relative to the eddy current element the magnets induce eddy currents therein. This advantageously avoids either having to fit the magnets to a separate component or increasing the inertial forces under axial movement, if the magnets are fitted to the armature disk.

The eddy current element preferably comprises cooling elements for the dissipation of heat. It is particularly advantageous if cooling elements are integrally formed on the eddy current element, for example. The cooling elements advantageously increase the area for the dissipation of heat, which is generated, in particular for example, by the eddy currents.

In a further preferred embodiment of the invention, an electromagnetic coil is at least partially enclosed by a housing of magnetically conductive material, in such a way that one face of the housing at least partially encloses an outer circumferential surface of the disk rotor without touching it. A passage for the magnetic lines of force can thereby be created, so that a considerable proportion of the magnetic flux passes through the circumferential surface. This affords the advantage that the magnetic flux is conducted mainly radially, and axial forces together with stresses thereby generated can be avoided.

An electromagnetic coil is preferably enclosed at least partially by magnetically conductive material, the housing being coordinated with the disk rotor and an element between the housing and the clutch axis of rotation that bears flatly against the disk rotor such that the magnetic flux is for the most part conducted via the element between the housing and clutch axis of rotation. The element may be a soft-magnetic annular disk, for example, which close to the clutch axis of rotation bears against the disk rotor, so that the magnetic flux from the disk rotor can enter directly into the annular disk and by way of an outer circumferential surface of the annular disk, for example, and a minimal gap can be conducted further radially to the magnetically conductive housing of the clutch without any contact occurring. This serves to further reduce axial forces acting on the disk rotor.

In a further preferred embodiment of the invention, the eddy current element comprises areas of magnetically conductive material. In particular, the magnetically conductive material is preferably fitted to the eddy current element in such a way that areas of the eddy current element composed of electrically highly conductive material are situated axially between the magnetically conductive areas and the magnets capable of exciting eddy currents. In this way the eddy current element affords a magnetic yoke for the magnetic flux produced by the eddy current-generating magnets.

In an especially preferred embodiment of the invention, the further clutch element comprises a device, so that a cylindrical or truncated cone-shaped bore or recess of a machine part to be driven can be fitted to the clutch element, centered in relation to the clutch axis of rotation by a bore diameter which is smaller than a diameter on which the magnets of the eddy current drive are situated. The centering device may be embodied, for example, as an annular axial elevation or extension, for example on the freely rotatable clutch element. The centering device is preferably made to fit the recess in the machine part, for example a fan impeller hub, precisely. The socket radially inset relative to the eddy current drive allows the clutch to have an axially compact construction.

BRIEF DESCRIPTION OF THE DRAWING

Further features and advantages of the invention will be described with reference to an exemplary embodiment of the friction clutch according to the invention represented schematically in the drawing.

FIG. 1 shows a schematically represented section along the axis of rotation through a friction clutch according to the invention.

DETAILED DESCRIPTION OF THE INVENTION

FIG. 1 depicts an electromagnetic friction clutch 1, which is designed to drive a fan impeller (not shown). The clutch 1 comprises an annular housing 2. Walls 2a, 2b, 2c enclose an annular chamber 2d in the housing 2, in which an electromagnetic coil 3 is accommodated. The electromagnetic coil is connected to an electrical current supply via a lead-through bushing 15. On a fourth side, the face of which is perpendicular to a clutch axis of rotation 17, the annular chamber 2d is covered by a disk rotor 4.

The disk rotor 4 is pushed onto a rotary shaft 10. So that it is freely rotatable, the rotary shaft 10 is fitted to the housing 2 by means of the ball bearing 13a, which is seated on the inside diameter of the annular housing 2. The rotary shaft 10 in turn carries a clutch element 6, which by means of a ball bearing 13b is supported so that it is freely rotatable in the bearing sleeve 6d concentrically both with the housing 2 and the disk rotor 4. The clutch element 6 is intended as driven flange for the fitting of a fan impeller.

At the side of the housing wall 2c a journal 10a of the rotary shaft 10 protrudes from the clutch housing 2, to which a drive element (not shown) such as a belt drive wheel, for example, can be fitted. The rotary shaft 10 is embodied as a hollow shaft and comprises a thread 10b, into which a clamping bolt 11 is screwed. By means of a locking ring 12a and the spacer rings 12b and 12c, the disk rotor 4 and the ball bearings 13a and 13b are arranged axially in relation to one another so that the clutch housing 2, the disk rotor 4 and the clutch element 6 are supported in such a way that without touching they are freely rotatable relative to one another.

By means of springs 9 allowing it to move axially, an armature disk 8 is fitted to the clutch element 6 on the side facing the disk rotor 4. With a current flowing through the coil 3, the armature disk 8 is therefore attracted axially towards the disk rotor 4 against the force of the springs 9. Both the rotor 4 and the armature disk 8 comprise a plurality of annular segments 4, 4a, 4b, 8, 8a, which are arranged concentrically with the clutch axis of rotation 17 and which are radially offset in relation to one another so that the magnetic flux generated by the electromagnets 3 flows alternately through the armature disk 8 and the disk rotor 4.

In an axial direction the outer annular wall 2b of the clutch housing 2 is drawn higher than the inner annular wall 2a, so that the annular wall 2b encloses the circumferential surface of the rotor 4 without touching it. This advantageously ensures that on actuation of the clutch the magnetic flux is conducted substantially in a radial direction and only slight forces occur in an axial direction. On actuation of the clutch the outermost edge of the rotor 4 is therefore scarcely moved in an axial direction and in the engaged state mechanical stresses in the disk rotor 4 are largely avoided.

An annular eddy current element 5 is fitted to the side of the rotor 4 facing the armature disk 8, on the outermost segment 4a, concentrically with the clutch axis of rotation. The eddy current ring 5 may be adhesively bonded or bolted to the rotor segment 4a, for example.

Because the eddy current ring 5 protrudes radially beyond the outside diameter of the clutch housing 2 to a considerable extent, cooling elements 5a are formed on the eddy current ring 5 in such a way that they extend from the eddy current ring 5 in an axial direction along the clutch housing 2 to the outside thereof, without touching it. Due to the comparatively simple geometry of the eddy current ring 5 and the cooling elements 5a, these can advantageously be manufactured together, for example by inexpensive molding. Said example of a manufacturing method moreover affords the possibility of additionally molding a plane steel ring (not shown) into the eddy current ring 5, in order to boost the excitation of eddy currents through an improved magnetic yoke.

At an axial interval from the eddy current ring 5, magnets 7 are fitted to the clutch element 6 on an outer edge area 6a, which is situated inside a radial area, defined by the eddy current ring 5, to the clutch axis of rotation 17. As soon as the disk rotor 4 and the clutch element 6 rotate relative to one another, for example in the mechanically disengaged state, the magnets 7 induce eddy currents on the eddy current ring 5, through the magnetic reaction to which a torque is transmitted from the eddy current ring 5 to the clutch element 6, for example.

At its side facing axially outwards from the clutch, the clutch element 6 is configured as a driven flange. On an annular area 6b a fan impeller, for example, may be fixed to the clutch element 6 by means of the bolt 16. A centering ring 6c assists the attachment of the hub of a fan impeller coaxially with the clutch axis of rotation, in order to avoid any imbalance and the associated oscillations. Since only minor heat dissipation requirements, if any, apply to the clutch element 6, the centering ring 6c can run relatively close around the bearing sleeve 6d, so that fan impellers of correspondingly small centering diameter can be fitted.

LIST OF REFERENCE NUMERALS 1 friction clutch
2 housing
2a inner annular wall
2b outer annular wall 2c wall
2d chamber
3 electromagnetic coil
4 disk rotor
4a outer annular segment
4b middle annular segment
4c inner annular segment
5 eddy current ring
5a cooling element
6 driven element
6a outer annular segment
6b annular segment for fixing
6c centering ring
6d bearing sleeve
7 magnet
8 armature disk
8a outer annular segment of the armature disk
9 spring
10 shaft
10a journal for belt wheel
10b thread
11 clamping bolt
12a lock washer
12b spacer washer
12c spacer washer
13a ball bearing
13b double-row ball bearing
14a gap
14b gap
15 lead
16 bolt
17 clutch axis of rotation

We claim:

1. An electromagnetic friction clutch, comprising a disk rotor consisting of a plane flat member having two planar main sides and apertures passing therethrough from one main side to the other main side, a further clutch element which is supported to be freely rotatable and which can be driven by the rotor through controllable friction contact, and eddy current elements for transmitting a rotational movement from the disk rotor to the further clutch element, wherein one of the eddy current elements is attached to an outer edge area of the disk rotor.

2. An electromagnetic friction clutch according to claim 1, wherein said one of the eddy current elements is fixed to an outer edge area of one of the planar main sides of the disk rotor.

3. An electromagnetic friction clutch according to claim 1, wherein the other one of the eddy current elements comprises magnets fitted to the further clutch element such that under a rotational movement of the clutch element relative to the disk rotor, the magnets excite eddy currents in said one of the eddy current elements.

4. An electromagnetic friction clutch according to claim 1, wherein said one of the eddy current elements comprises cooling elements for the dissipation of heat.

5. An electromagnetic friction clutch according to claim 1, further comprising an electromagnetic coil at least partially enclosed by a housing of magnetically conductive material such that one face of the housing at least partially encloses the outer circumferential surface of the disk rotor without touching the disk rotor.

6. An electromagnetic friction clutch according to claim 1, further comprising an electromagnetic coil enclosed at least partially by a housing of magnetically conductive material, the housing being coordinated with the disk rotor and an element between the housing and the clutch axis of rotation that bears flatly against the disk rotor such that the magnetic flux is conducted through the element between the housing and clutch axis of rotation.

7. An electromagnetic friction clutch according to claim 1, wherein said one of the eddy current elements comprises areas of magnetically conductive material.

8. An electromagnetic friction clutch according to claim 1, wherein the further clutch element comprises a device that allows a cylindrical or truncated cone-shaped bore or recess of a machine part that is driven to be fitted to the clutch element, centered in relation to the clutch axis of rotation by a bore diameter which is smaller than a diameter on which magnets of the eddy current drive are situated.

9. An electromagnetic friction clutch according to claim 1, wherein said one of the eddy current elements is attached to an outer peripheral edge area of the disk rotor.

* * * * *